(12) United States Patent
Estlick et al.

(10) Patent No.: US 8,819,397 B2
(45) Date of Patent: Aug. 26, 2014

(54) PROCESSOR WITH INCREASED EFFICIENCY VIA CONTROL WORD PREDICTION

(75) Inventors: Michael D. Estlick, Fort Collins, CO (US); Jay Fleischman, Ft. Collins, CO (US); Debjit Das Sarma, San Jose, CA (US); Emil Talpes, Sunnyvale, CA (US); Krishnan V. Ramani, Cupertino, CA (US); Chun Liu, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 759 days.

(21) Appl. No.: 13/037,830

(22) Filed: Mar. 1, 2011

(65) Prior Publication Data

US 2012/0226891 A1    Sep. 6, 2012

(51) Int. Cl.
*G06F 9/38* (2006.01)
*G06F 9/30* (2006.01)

(52) U.S. Cl.
CPC .......... *G06F 9/3861* (2013.01); *G06F 9/30094* (2013.01); *G06F 9/3842* (2013.01)
USPC ....................................................... 712/220

(58) Field of Classification Search
CPC .. G06F 9/30094; G06F 9/3842; G06F 9/3861
See application file for complete search history.

(56) References Cited

U.S. PATENT DOCUMENTS

| 5,930,492 A | * | 7/1999 | Lynch ........................... 712/216 |
| 6,405,305 B1 | * | 6/2002 | Meier et al. .................... 712/222 |
| 6,779,103 B1 | * | 8/2004 | Alexander et al. ............ 712/217 |
| 2005/0033946 A1 | * | 2/2005 | Abadallah et al. ............ 712/235 |

\* cited by examiner

*Primary Examiner* — Eric Coleman
(74) *Attorney, Agent, or Firm* — Park, Vaughan, Fleming & Dowler, LLP

(57) ABSTRACT

Methods and apparatuses are provided for increased efficiency in a processor via control word prediction. The apparatus comprises an operational unit capable of determining whether an instruction will change a first control word to a second control word for processing dependent instructions. Execution units process the dependent instructions using a predicted control word and compare the second control word to the predicted control word. A scheduling unit causes the execution units to reprocess the dependent instructions when the predicted control word does not match the second control word. The method comprises determining that an instruction will change a first control word to a second control word and processing the dependent instructions using a predicted control word. The second control word is compared to the predicted control word and the dependent instructions are reprocessed using the second control word when the predicted control word does not match the second control word.

15 Claims, 4 Drawing Sheets

PROCESSOR WITH INCREASED EFFICIENCY VIA CONTROL WORD PREDICTION

TECHNICAL FIELD

The subject matter presented here relates to the field of information or data processors. More specifically, this invention relates to the field of processor efficiency enhancements using speculative instruction processing based upon control word prediction.

BACKGROUND

Superscalar processors achieve higher performance by executing multiple instructions concurrently using multiple pipelines. However, dependencies between instructions may limit how many instructions may be issued or processed at any given time. As a result, some processors support speculative execution in order to achieve additional performance gains. The objective of speculative processing is to achieve full utilization of the pipeline of the processor, thereby preventing instruction stalls or delays within the processor.

One type of speculation is data speculation. For example, predicting the value of data items may involve observing patterns in data and basing the prediction on those patterns. Another type of speculation is control flow speculation. Control flow speculation predicts the direction in which program control will proceed. For example, branch prediction may be used to predict whether a particular branch will be taken during processing. Generally, in any speculation scheme, if the speculation is incorrect, the instructions that were speculatively processed and/or executed must be re-executed with updated or non-speculative information.

Since speculation allows execution to proceed without waiting for dependency checking to complete, significant performance gains may be achieved if the performance gained from correct speculations exceeds the performance lost due to incorrect speculations (and subsequent re-processing). Accordingly, it is desirable to be able to perform speculative processing in a processor and to provide an efficient recovery mechanism for mispredictions.

SSE (Streaming Single-Instruction-Multiple-Data Extensions) and x87 are extensions of the x86 instruction set. Most instructions in SSE and x87 are dependent upon the x87 control word or the value of the SSE Multimedia Extensions Control and Status Register (MXCSR). Some instructions are known to change the control word during processing and are commonly referred to as control word changing (CWC) instructions. Conventionally, instructions subsequent to and dependent upon a CWC instruction must wait until completion of the CWC instruction so that the new (changed) control word is known. Delaying dependent (subsequent) instructions waiting a control word change reduces performance and increases latency, and therefore, should be avoided. However, within typical program hierarchies, CWC instructions often reside in subroutines that are called at various times and in various places by a running main program. Accordingly, predicting a control word change is problematic since the changed control word depends upon both the instruction calling the CWC instruction and the CWC changing instruction itself.

BRIEF SUMMARY OF THE EMBODIMENTS

An apparatus is provided for increased efficiency in a processor via control word prediction. The apparatus comprises an operational unit capable of determining whether an instruction will change a first control word to a second control word for processing dependent instructions and execution units for processing the dependent instructions using a predicted control word and for processing the instruction to provide the second control word. The execution units compare the second control word to the predicted control word and a scheduling unit causes the execution units to reprocess the dependent instructions when the predicted control word does not match the second control word.

A method is provided for increased efficiency in a processor via control word prediction. The method comprises determining that an instruction will change a first control word to a second control word for dependent instructions and then processing the dependent instructions using a predicted control word. The second control word is compared to the predicted control word and the dependent instructions are reprocessed using the second control word when the predicted control word does not match the second control word.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, the following detailed description or for any particular processor microarchitecture.

Figure 1:
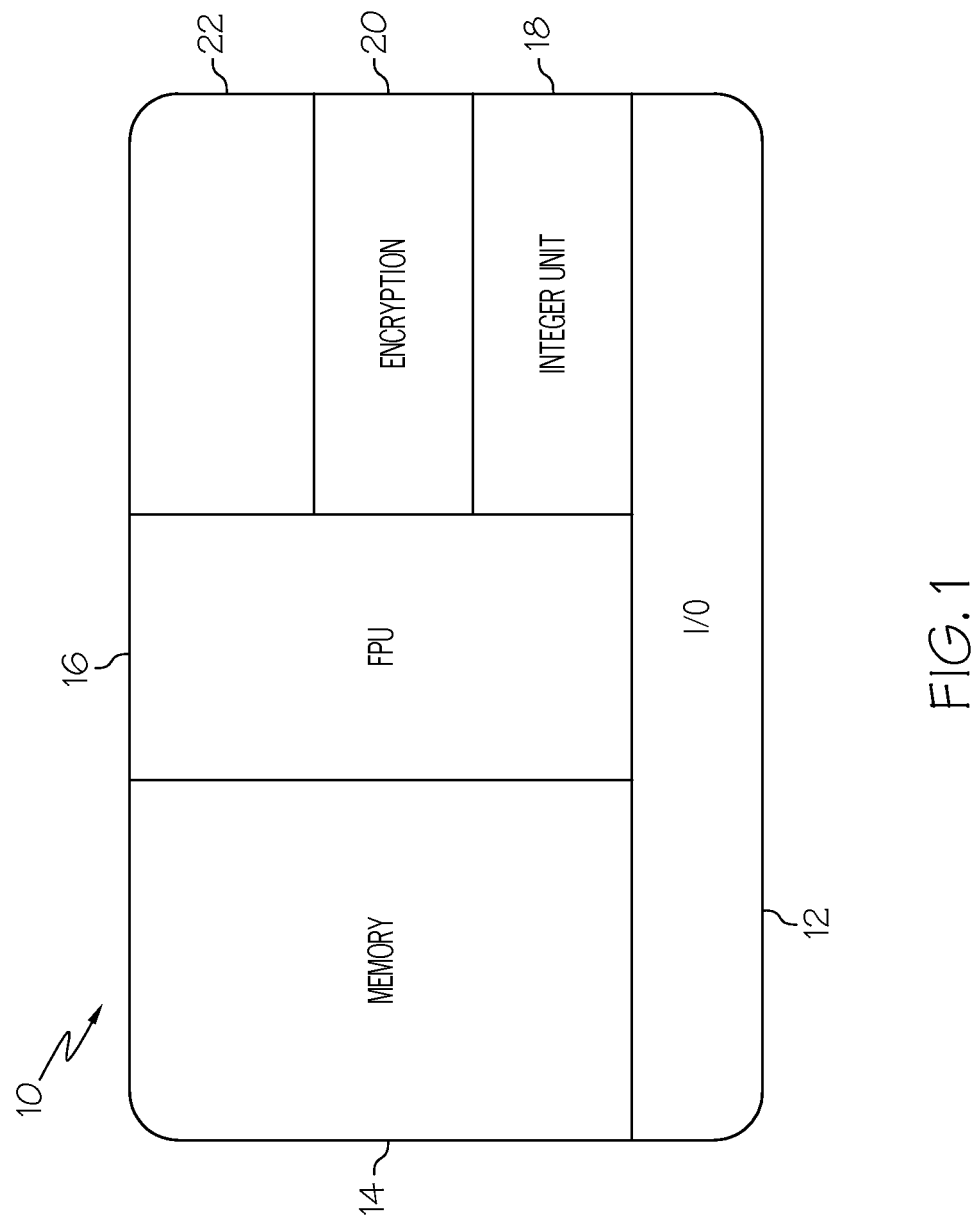
FIG. 1 is a simplified exemplary block diagram of processor suitable for use with the embodiments of the present disclosure.

Referring now to FIG. 1, a simplified exemplary block diagram is shown illustrating a processor 10 suitable for use with the embodiments of the present disclosure. In some embodiments, the processor 10 would be realized as a single core in a large-scale integrated circuit (LSIC). In other embodiments, the processor 10 could be one of a dual or multiple core LSIC to provide additional functionality in a single LSIC package. As is typical, processor 10 includes an input/output (I/O) section 12 and a memory section 14. The memory 14 can be any type of suitable memory. This would include the various types of dynamic random access memory (DRAM) such as SDRAM, the various types of static RAM (SRAM), and the various types of non-volatile memory (PROM, EPROM, and flash). In certain embodiments, additional memory (not shown) "off chip" of the processor 10 can be accessed via the I/O section 12. The processor 10 may also include a floating-point unit (FPU) 16 that performs the float-point computations of the processor 10 and an integer processing unit 18 for performing integer computations. Within a processor, numerical data is typically expressed using integer or floating-point representation. Mathematical computations within a processor are generally performed in computational units designed for maximum efficiency for each computation. Thus, it is common for processor architecture to have an integer computational unit and a floating-point computational unit. Additionally, an encryption unit 20 and various other types of units (generally 22) as desired for any particular processor microarchitecture may be included.

Figure 2:
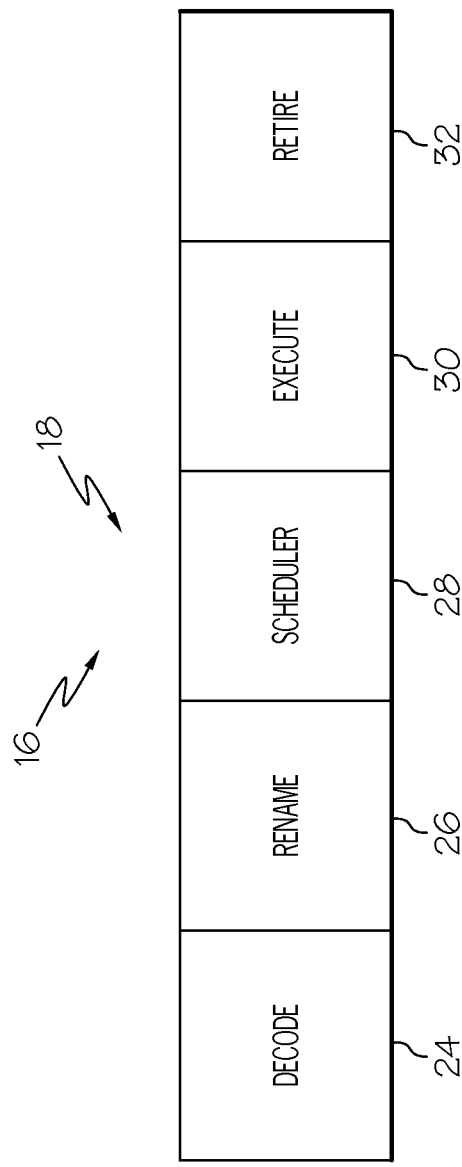
FIG. 2 is a simplified exemplary block diagram of an operational (e.g., floating-point or integer) unit suitable for use with the processor of FIG. 1.

Referring now to FIG. 2, a simplified exemplary block diagram of an operational unit suitable for use with the processor 10. In one embodiment, FIG. 2 could operate as the floating-point unit 16, while in other embodiments FIG. 2 could illustrate the integer unit 18.

In operation, the decode unit 24 decodes the incoming instructions or operation-codes (opcodes) dispatched (or fetched by) an operational unit. The decode unit 24 is responsible for the general decoding of instructions (e.g., x86 instructions and extensions thereof) and how the delivered opcodes may change from the instruction. The decode unit 24 will also pass on physical register numbers (PRNs) from an available list of PRNs (often referred to as the Free List (FL)) to the rename unit 26.

The rename unit 26 maps logical register numbers (LRNs) to the physical register numbers (PRNs) prior to scheduling and execution. According to various embodiments of the present disclosure, the rename unit 26 can be utilized to rename or remap logical registers in a manner that eliminates the need to actually store known data values in a physical register. This saves operational cycles and power, as well as decreasing latency.

The scheduler 28 contains a scheduler queue and associated issue logic. As its name implies, the scheduler 28 is responsible for determining which opcodes are passed to execution units and in what order. In one embodiment, the scheduler 28 accepts renamed opcodes from rename unit 26 and stores them in the scheduler 28 until they are eligible to be selected by the scheduler to issue to one of the execution pipes.

The execute unit(s) 30 may be embodied as any generation purpose or specialized execution architecture as desired for a particular processor. In one embodiment the execution unit may be realized as a single instruction multiple data (SIMD) arithmetic logic unit (ALU). In other embodiments, dual or multiple SIMD ALUs could be employed for super-scalar and/or multi-threaded embodiments, which operate to produce results and any exception bits generated during execution.

In one embodiment, after an opcode has been executed, the instruction can be retired so that the state of the floating-point unit 16 or integer unit 18 can be updated with a self-consistent, non-speculative architected state consistent with the serial execution of the program. The retire unit 32 maintains an in-order list of all opcodes in process in the floating-point unit 16 (or integer unit 18 as the case may be) that have passed the rename 26 stage and have not yet been committed by to the architectural state. The retire unit 32 is responsible for committing all the floating-point unit 16 or integer unit 18 architectural states upon retirement of an opcode.

Figure 3:
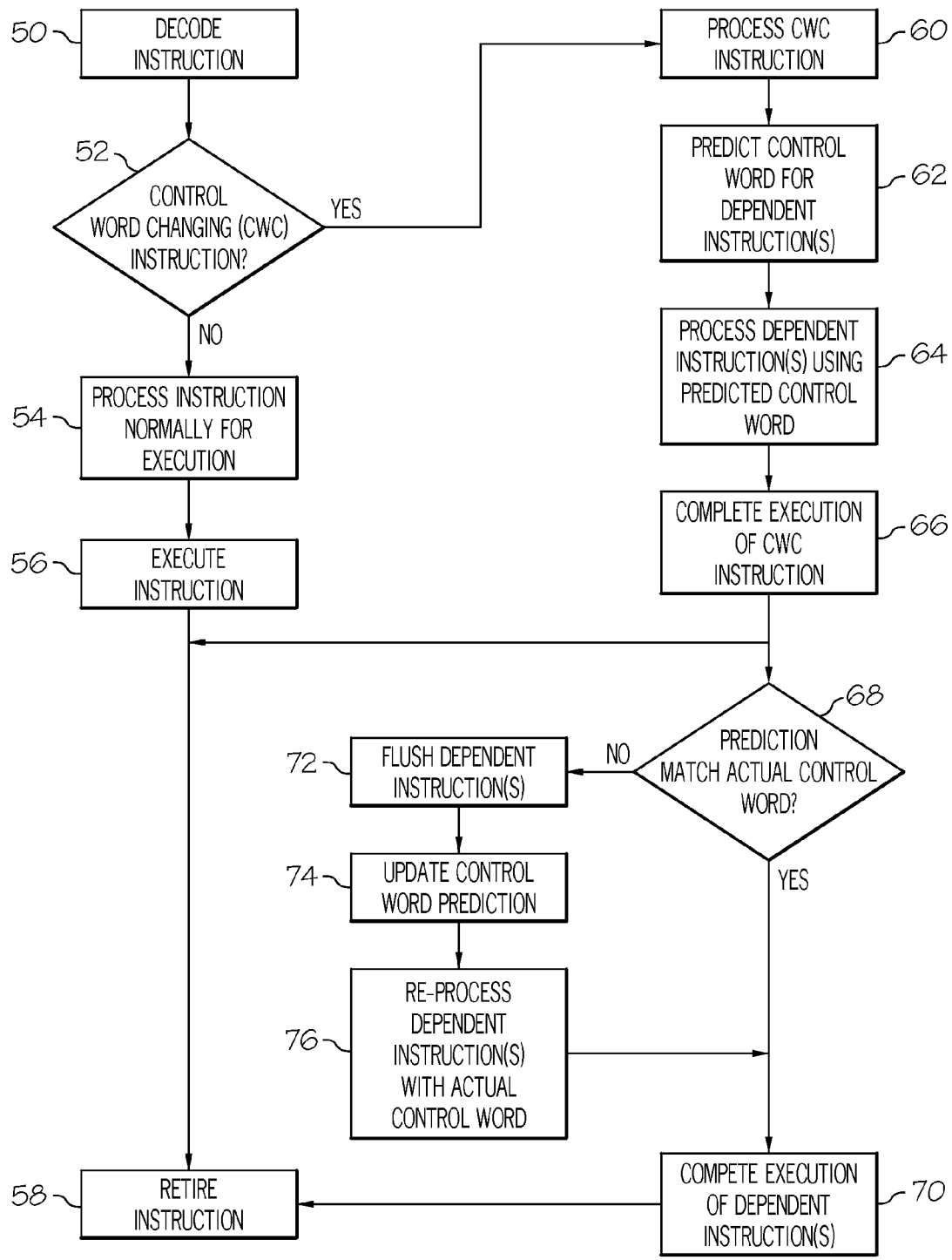
FIG. 3 is exemplary flow diagram illustrating a method for processing instructions using control word prediction according to one embodiment of the present disclosure.

Referring now to FIG. 3, an illustration of an exemplary flow diagram illustrating the method of the embodiments for processing instructions using control word prediction is shown. The various tasks performed in connection with the process of FIG. 3 may be performed by software, hardware, firmware, or any combination thereof. For illustrative purposes, the following description of the process of FIG. 3 may refer to elements mentioned above in connection with FIGS. 1-2. In practice, portions of the process of FIG. 3 may be performed by different elements of the described system. It should also be appreciated that the process of FIG. 3 may include any number of additional or alternative tasks and that the process of FIG. 3 may be incorporated into a more comprehensive procedure or process having additional functionality not described in detail herein. Moreover, one or more of the tasks shown in FIG. 3 could be omitted from an embodiment of the process of FIG. 3 as long as the intended overall functionality remains intact.

Beginning in step 50, an instruction is decoded (for example in decode unit 24 of FIG. 2). Next decision 52 determines if the instruction is a control word changing (CWC) instruction such as by comparing to a table or any other convenient means. If the determination of decision 52 is that the decoded instruction is not a CWC instruction, the instruction is processed normally (step 54), executed (step 56) and retired (step 58). However, as noted above, many instructions in the SSE and x87 instruction sets (for example) modify or change a control word associated with the instruction during its processing. The changed (or modified) control word is then used during the processing of one or more subsequent instructions. Proper processing of these subsequent instructions is dependent upon the changed control word, however, embodiments of the present disclosure predict the changed control word and speculatively begin processing the dependent instructions in advance of knowing the actual value of the changed control word.

Accordingly, if the determination of decision 52 is that the instruction is a CWC instruction, the method begins processing the CWC instruction (step 60) and step 62 provides a predicted control word that will be used to begin processing the subsequent or dependent instructions (step 64) in advance of knowing the actual control word that will be provided by the CWC instruction. In this way, substantial efficiency improvements can be achieved when the prediction is correct, or at least, is correct often enough to offset any loss of time (efficiency) by reprocessing the subsequent or dependent instructions when the prediction is not correct as will be hereinafter described.

In one embodiment, the predicted control word is selected from a control word prediction table that will be discussed in more detail below. In other embodiments a history table of control words could be examined or any other suitable prediction scheme or algorithm could be used. According to the embodiments of the present disclosure, the control word prediction may occur at any convenient location in a processor microarchitecture including the decode unit (24 of FIG. 2), the scheduling unit (28 of FIG. 2) or the execution unit(s) (30 of FIG. 2). Once the control word for the dependent instructions is predicted, processing begins (step 64) and the instructions progress through various stages of the execution unit(s) until completion (execution) of the CWC instruction (step 66). Once the CWC instruction has been executed (which may then be retired in step 58), the changed (or modified) control word is known, and decision 68 compares the predicted control word to the actual control word and determines whether a match or correspondence exists. If so, the dependent control words are further processed until all have been executed (step 70) and the dependent instructions are retired (step 58).

If, however, the determination of decision 68 is that the predicted control word does not match the actual control word, then a misprediction has occurred and the dependent instructions must be reprocessed using the known correct control word. While this results in some inefficiency since other instructions could have been processed instead of the speculative processing of the dependent instructions, the embodiments of the present disclosure contemplate adapting the control word prediction system to improve accuracy in future predictions. In this way, individual misprediction events do not substantially reduce the overall efficiency gains by speculatively processing the dependent instructions using predicted control words.

Accordingly, upon a misprediction, further processing of the dependent instructions ceases and the dependent instructions are flushed out of the execution pipelines (step 72). Next, an update is made to the prediction process (step 74) so that prediction accuracy will be improved for the next predicted control word. In one embodiment, the update comprises writing the actual control word into a control word prediction table that can be addressed (indexed) to select a predicted control word. In other embodiments, an adjustment may be made to a prediction algorithm or weighting to various prediction factors can be modified to enhance prediction accuracy. Since the actual control word is now known, the subsequent or dependent instructions can be reprocessed knowing the control word used during the reprocessing is correct (step 76). After all dependent instructions have been processed using the actual control word, the dependent instructions can be retired (step 58).

Figure 4A:
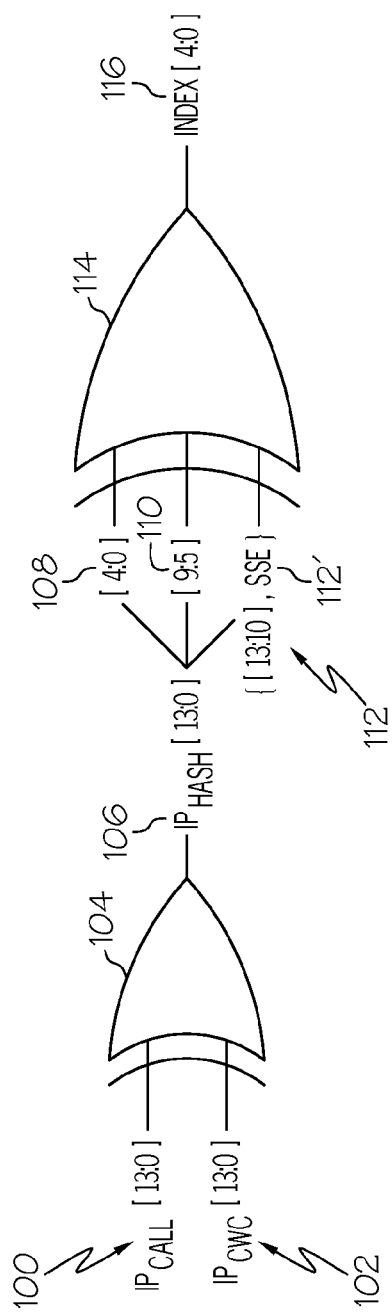
FIGS. 4A and 4B are exemplary diagrams illustrating a method for control word prediction according to one embodiment of the present disclosure.
Figure 4B:
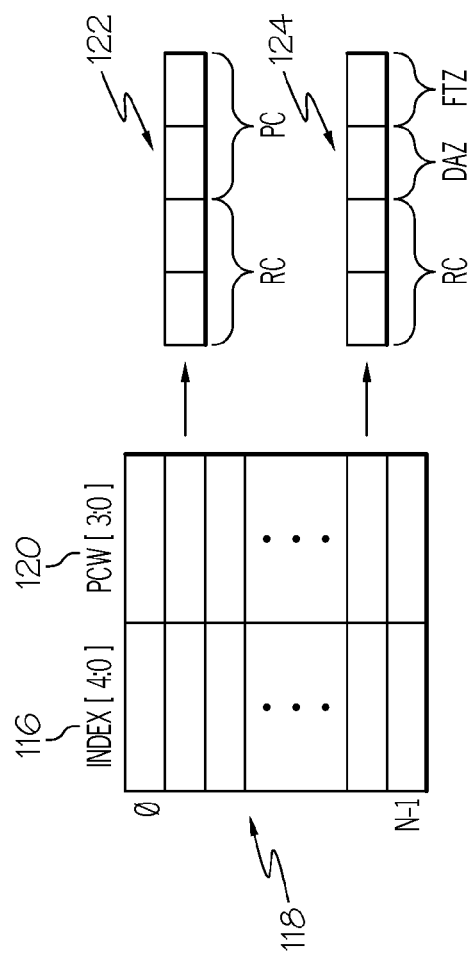

Referring now to FIGS. 4A and 4B, illustrations are depicted for an exemplary process for predicting control words for use in the method of FIG. 3. As noted above, CWC instructions often reside in subroutines that are called at various times and in various places by a running main program. Accordingly, the actual control word provided by the CWC instruction depends upon both the instruction calling the CWC instruction and the CWC changing instruction itself. In FIG. 4A, an instruction pointer 100 for the instruction calling the CWC instructions and an instruction pointer 102 for the CWC instruction are logically exclusive ORed (104) to produce a XOR hash of the instruction pointers 106. As is known, a hash is a method of reducing a value to rapidly index or address a larger table of values. In one embodiment, bit zero through bit 13 (denoted as [13:0]) of each instruction pointer are XORed as follows: $IP_{Call}[13:0]$ XOR $IP_{CWC}[13:0]$=$IP_{Hash}[13:0]$. Next, bits zero through 13 of the resultant instruction pointer hash 106 are further hashed by processing selected bits together. Thus, bits zero through 4 (108), bits 5 thorough 9 (110), and bits 10 through 13 are XORed together (114), with an SSE bit 112' included (collectively 112) to indicate whether the predicted control word will be used as an x87 control word or written into the MXCSR register for an SSE instruction. The resultant five-bit Index [4:0] is used to index or address a control word prediction table in one embodiment to provide the predicted control word.

Referring to FIG. 4B, the control word prediction table 118 comprises in one embodiment a 32-entry table having a five-bit index 116 address a four-bit predicted control word 120. Any suitable number of predicted control words of any width may be addressed by an appropriately wide index 116.

Referring to FIG. 4B, the control word prediction table 118 comprises in one embodiment a 32-entry table having a five-bit index 116 addressing a four-bit predicted control word 120. In other embodiments, any suitable number of predicted control words 120 of any width may be addressed by an appropriately wide index 116. By using the instruction pointers of the calling instruction and the CWC instruction, a unique index value related to the two instructions is created to select a predicted control word most likely to be used in processing dependent instructions for that situation. Moreover, in the event of a misprediction, the actual control word is updated (step 74 of FIG. 3) into the control word prediction table 118 so that the next call of the CWC instruction by the same calling instruction is sure to have the correct prediction for the control word.

As an example, and not as a limitation, the predicted control word for an x87 instruction 122 comprises a four-bit word including the two-bit rounding control (RC) and the two-bit precision control (PC) fields. For an SSE instruction, the predicted control word 124 includes the two-bit rounding control (RC) field, the one-bit denormal-are-zero (DAZ) field and the one-bit flush-to-zero (FTZ) field. In some embodiments, the predicted control word may be combined with exception mask bits for processing x87 or SSE instructions. In such embodiments, the exception mask bits may also be compared to that provided by the CWC instruction (for example in decision 68 of FIG. 3) as another measure of misprediction.

Various processor-based devices that may advantageously use the processor (or any computational unit) of the present disclosure include, but are not limited to, laptop computers, digital books or readers, printers, scanners, standard or high-definition televisions or monitors and standard or high-definition set-top boxes for satellite or cable programming reception. In each example, any other circuitry necessary for the implementation of the processor-based device would be added by the respective manufacturer. The above listing of processor-based devices is merely exemplary and not intended to be a limitation on the number or types of processor-based devices that may advantageously use the processor (or any computational unit) of the present disclosure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method, comprising:
   in a processor, performing operations for:
      providing a predicted control word for processing one or more instructions subsequent to a control word changing instruction, wherein providing the predicted control word comprises:
         generating an index based on an instruction pointer for the control word changing instruction and an instruction pointer for a calling instruction; and acquiring a predicted control word from a control word prediction table based on the index;

processing, the control word changing instruction to generate an actual control word;

comparing the predicted control word to the actual control word; and when the predicted control word does not match the actual control word, reprocessing the one or more instructions subsequent to the control word changing instruction using the actual control word.

2. The method of claim 1, further comprising updating the control word prediction table based on the actual control word.

3. The method of claim 1, wherein reprocessing the one or more instructions subsequent to the control word changing instruction using the actual control word comprises ceasing further processing of the one or more instructions subsequent to the control word changing instruction and rescheduling the one or more instructions subsequent to the control word changing instruction for processing using the actual control word.

4. A method, comprising:

in a processor, performing operations for:

determining that an instruction may change a control word that is used for processing dependent instructions;

processing the dependent instructions using a predicted control word, the predicted control word acquired based on information associated with the instruction and information associated with a subsequent instruction; and after processing the instruction, comparing the control word to the predicted control word and reprocessing the dependent instructions when the predicted control word does not match the control word.

5. The method of claim 4, further comprising selecting the predicted control word from a control word prediction table based on the information associated with the instruction and information associated with the subsequent instruction.

6. The method of claim 4, further comprising updating the a control word prediction table based on the control word when the predicted control word does not match the control word.

7. The method of claim 5, wherein selecting the predicted control word from the control word prediction table comprises determining an index value for selecting the predicted control word from the control word predication table, the index value based on the information associated with the instruction and information associated with the subsequent instruction.

8. The method of claim claim 4, wherein the information associated with the instruction comprises an instruction pointer for the instruction and the information associated with the subsequent instruction comprises an instruction pointer for the subsequent instruction.

9. The method of claim 4, wherein reprocessing the dependent instructions comprises ceasing further processing of the dependent instructions and rescheduling the dependent instructions for processing using the control word.

10. A processor, comprising:

an operational unit that determines that an instruction may change a control word that is used for processing dependent instructions;

execution units that:

process the dependent instructions using a predicted control word, the predicted control word acquired based on information associated with the instruction and information associated with a subsequent instruction, and process the instruction and, after processing the instruction, compare the control word to the predicted control word; and a scheduling unit that causes the execution units to reprocess the dependent instructions when the predicted control word does not match the control word.

11. The processor of claim 10, including a unit to retire the dependent instructions when the predicted control word matches the control word.

12. The processor of claim 10, wherein the execution units reprocess the dependent instructions using the control word.

13. The processor of claim 10, including a control word prediction table for providing the predicted control word.

14. The processor of claim 13, wherein the control word prediction table is updated based on the control word when the predicted control word does not match the control word.

15. A device comprising the processor of claim 10, the device comprising at least one of a group consisting of: a computer; a digital book; a printer; a scanner; a television; or a set-top box.

* * * * *